UNITED STATES PATENT OFFICE.

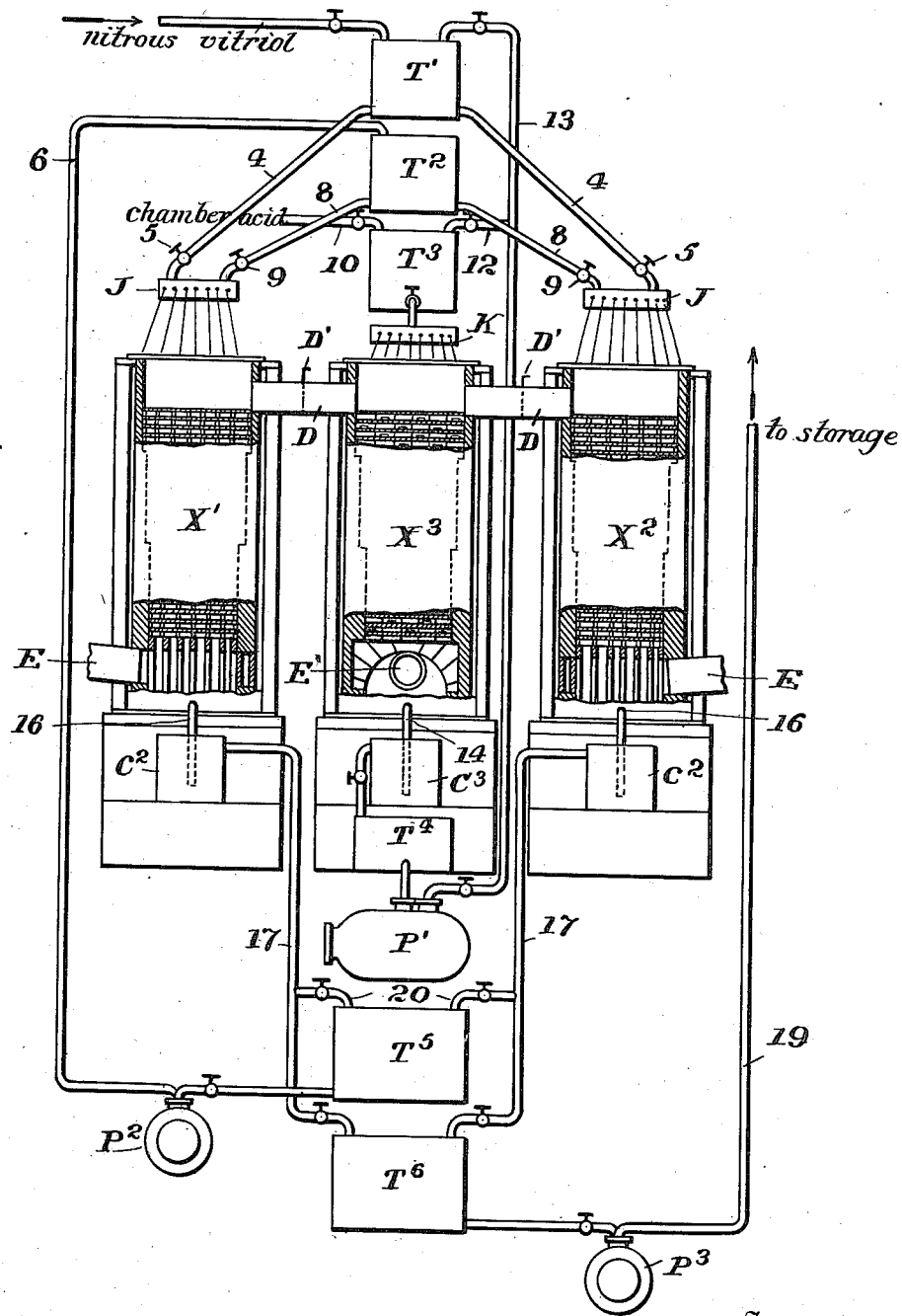

OTTO PROELSS, OF KANSAS CITY, MISSOURI.

PROCESS OF MAKING SULFURIC ACID.

963,175.  Specification of Letters Patent.  Patented July 5, 1910.

Application filed December 11, 1908. Serial No. 467,087.

*To all whom it may concern:*

Be it known that I, OTTO PROELSS, a citizen of the United States, and resident of Kansas City, Missouri, have invented certain new and useful Improvements in Processes of Making Sulfuric Acid, of which the following is a specification.

This invention relates to the manufacture and concentration of sulfuric acid, and to this end embodies a certain process and means whereby to effect the result with a minimum expenditure of fuel and labor, as fully set forth hereinafter and illustrated in the accompanying drawing which shows in sectional elevation one form of apparatus which may be employed.

In the said apparatus there are three independent chambers $X'$, $X^2$, $X^3$, which may be in independent towers, as shown in the drawings, or within a single structure in which they are separated by suitable partitions, and in said chambers is arranged in any manner which may be found most suitable masses of refractory material, as for instance chemical brick, the arrangement corresponding to such as is usually employed in what are known as "Glover" towers.

Two of the chambers $X'$, $X^2$, are practically identical in their characteristics, and both of these chambers communicate through suitable conduits or pipes D with what is herein termed the intermediate chamber $X^3$, each of the said conduits being provided with a valve $D'$.

By means of suitable bonding material the lining of both of the chambers $X'$, $X^2$ may be arranged in such a manner that neither hot concentrated acid nor the hot gases will be able to destroy the lining.

For convenience I term the chambers $X'$, $X^2$, the concentrating chambers, or chambers of the concentrating means, and the chamber $X^3$ the intermediate or mixing and cooling chamber without however intending to limit the construction to any particular arrangement of the chambers except such as will permit gases from either or both of the chambers $X'$, $X^2$ to be carried to the other chamber.

Each of the concentrating chambers is provided with means whereby it may be supplied with burner gases, or sulfur dioxid, from burners, roasting furnaces, etc., which may be mixed with nitrogen peroxid in the usual way. As shown each of the said chambers has an inlet pipe E near the lower end, and the chamber $X^3$ has an outlet pipe $E'$, at the lower end; such pipe may communicate with a suitable exhaust fan, not shown, that will propel the gases to the usual lead chambers.

The apparatus thus far described is shown in my co-pending application Serial No. 372,980, filed May 10th, 1907, and the method utilizing the apparatus is claimed therein.

Means are provided whereby either of the concentrating chambers may be supplied with a nitrating material and with a weak acid, such supply conducted alternately to the said chambers, and means are also provided whereby the liquid flowing from either chamber where denitration is effected is conducted to the top of the other chamber, which in such case constitutes the high concentration chamber, and means are also provided for supplying the intermediate chamber with a cold, weak acid solution, and the liquid from this chamber may be conducted upward by suitable means and mixed with the nitrating medium flowing to either of the concentrating chambers.

As shown there are three tanks $T'$, $T^2$, $T^3$, arranged at suitable elevations above all of the chambers, and one of the said tanks, as the tank $T'$, is supplied through a pipe 3 with nitrous vitriol and has two discharge pipes 4, 4, provided with cocks 5, leading to distributers J, above the concentrating chambers, said distributers having spray openings so as to discharge the liquid in fine jets into the chambers below.

Another tank, as the tank $T^2$, is supplied, through the pipe 6 and through the medium of the pump $P^2$, with liquor from a tank $T^5$, and distributes the said liquor through pipes 8, 8, provided with cocks 9, 9, to the distributers J, while the remaining tank $T^3$ receives a weak acid, or chamber acid, either through a supply pipe 10 or through a branch 12, leading from a pipe 13, into which liquor passing from the discharge pipe 14 of the intermediate chamber is pumped by means of a pump $P'$, said pipe 13 also passing to the tank $T'$, and between the discharge pipe 14 and the pump $P'$ may be arranged a cooler $c^3$ and a reservoir or tank $T^4$.

The discharged liquor from each of the concentrating chambers flows through a pipe or conduit 16, and may pass directly or through a cooler $c^2$ and pipe 17 to a tank $T^6$, and the pump $P^3$ serves to withdraw the liquid from the tank $T^6$ and pass it on through a pipe 19 to suitable storage tanks. The pipes 17 are also provided with branches 20 leading to the tank $T^5$. The tank $T^3$ may discharge its contents into a distributer K, which is above the chamber $X^3$ and discharges into the latter.

In the operation of the above described apparatus both of the concentrating chambers receive burner gases which pass through the same, and one of the chambers $X'$, $X^2$, is fed with a mixture of weak acid and nitrous vitriol at such a rate regulated by the valves 5 that the acid will be discharged at the bottom at the usual strength (60 to 62° Be.). The liquid discharged from this chamber is then elevated through the pipe 6 to the tank $T^2$, and a portion thereof is discharged, through one of the pipes 8 and distributer J, into the other chamber where it is concentrated, the action being so regulated that the acid shall be concentrated to 66° Be., or to any desired greater strength above that which is supplied to this chamber. To obtain this concentrated acid free from nitrogen compounds no nitrating material in any shape must be admitted to the chamber used for high concentration, the denitration being performed wholly in the other chamber. Therefore the burner gas flue leading to the chamber in which the concentration process is then performed is not supplied with nitrogen oxids. This may be accomplished in various ways, for instance, by shutting off the niter ovens through which the burner gases pass or cutting off the supply of the material which produces the nitrogen oxid.

The gases issuing from the top of the denitrating chamber will be moderately warm and laden with nitrogen compounds, and passing to the chamber $X^3$ are mixed with the hot gases passing from the other chamber, and are cooled by the discharge of cold, weak acid from the distributer K, and the solution passing downward in the chamber $X^3$ and discharged therefrom may be pumped by the pump $P'$ into either the tank $T'$, to be used in connection with the nitrous vitriol in the denitrating chamber, or into the tank $T^3$ to be again employed in the intermediate chamber. The gases from the concentrating chambers are thus so mixed and cooled in the intermediate chamber that they cannot effect any damage to the lead work.

The above described operations may be performed alternately with the two chambers $X'$, $X^2$, either of them acting as a denitrating chamber at the time that the other acts as a high concentrating chamber, and the liquid from each of the said chambers as well as that from the intermediate chamber $X^3$ is cooled by means of the coolers $c^2$, $c^3$, so as to be reduced to the proper working temperature.

In the manufacture of sulfuric acid it has been found that the principal impurities, especially iron, which are absorbed by the sulfuric acid circulating in the concentrating chambers will be separated and deposited in the said chambers as solid particles if the concentration is carried above approximately 64° Baumé. This deposit of the impurities will in time result in so clogging and obstructing the interstices of the material in the said chambers as to interfere with or prevent further operations, but it has been found that if a weaker solution is passed through the chamber in which such deposit has occurred the impurities will again be taken up and the chamber thereby cleansed or freed from obstructions.

It will be seen that by first concentrating the acid to a sufficiently high degree to insure the deposit of the impurities, and then discontinuing the high concentration in the chamber where such deposit occurs and bringing the weak acid into contact with said impurities, I am enabled to remove the deposit and restore the said chamber to its original effective condition while the deposit is taking place in the other chamber, from which it is then removed in like manner, and by thus alternating the action in the two chambers the desired concentration may be effected with a minimum expenditure of time and labor, all of the chambers being continuously in effective operation. Further by the employment of the intermediate chamber the warm gases from the denitrating means and the hot gases from the high concentrating means are mingled together and their temperature reduced, and a further reduction is effected by the supply of cold weak acid, a certain amount of concentration being effected also in the said intermediate chamber.

Without limiting myself to the precise construction and operations above described, I claim as my invention:

1. In the manufacture and concentration of sulfuric acid, subjecting a weak acid to treatment with hot burner gases in a chamber to concentrate the acid to a degree exceeding 63° Be. and to insure a deposit of the principal impurities, and thereafter treating weaker acid in the same chamber to clear the latter by the solution of the said impurities.

2. In the manufacture and concentration of sulfuric acid, treating a solution of sulfuric acid of less strength than 63° Be. with hot burner gases to concentrate the acid and cause a deposit of impurities, and simultaneously treating a mixture of weak acid and nitrous vitriol with burner gases, to secure a solution of medium strength, and thereafter subjecting the said deposits to the action of the last named solution, to dissolve the same.

3. In the manufacture and concentration of sulfuric acid, treating two solutions of acid independently and simultaneously with two different volumes of hot burner gases, and also denitrating one solution, and concentrating the other to an extent to deposit impurities thereof, and thereafter dissolving the said impurities by the denitrated solution.

4. In the manufacture and concentration of sulfuric acid, treating two solutions of acid independently and simultaneously with two different volumes of hot burner gases, and also denitrating one solution, and concentrating the other to an extent to deposit impurities thereof, and thereafter dissolving the said impurities by the denitrated solution, and mixing together the gases passing from both operations and subjecting them to the action of cool, weak acid to cool the same.

5. The method of manufacturing concentrated sulfuric acid which consists in exposing a body of the acid to the action of hot gases so as to concentrate the acid to a sufficient extent to cause the deposit of the impurities thereof, suspending the concentrating process, and removing the impurities by a body of weak acid.

6. The method of manufacturing concentrated sulfuric acid which consists in concentrating a body of the acid in one chamber to an extent sufficient to cause the deposit of the impurities thereof, then shifting the acid supply to another chamber and causing the concentrating process to take place therein, and simultaneously removing the impurities in the first chamber by a solvent.

7. The method of manufacturing concentrated sulfuric acid which consists in concentrating a body of the acid in one chamber to an extent sufficient to cause the deposit of the impurities thereof and simultaneously causing a solvent to remove the impurities deposited in another chamber, and then interchanging the acid and the solvent so that the concentration is carried on in the second chamber while the solvent action is carried on in the first chamber.

8. The method of manufacturing concentrated sulfuric acid which consists in exposing a body of the acid in one chamber to the action of hot burner gases to an extent sufficient to cause the deposit of the impurities thereof, then causing the concentrating process to take place in another chamber, and simultaneously removing the impurities in the first chamber by a solvent.

9. The method of manufacturing concentrated sulfuric acid which consists in exposing a body of the acid in one chamber to the action of hot burner gases to an extent sufficient to cause the deposit of the impurities thereof and simultaneously exposing a weak acid to the action of burner gases in the second chamber, and thereafter interchanging the functions of the chambers so that the concentration is carried on in the second chamber while the solvent action is carried on in the first chamber.

10. The method of manufacturing concentrated sulfuric acid which consists in conducting burner gases through a denitrating tower supplied with nitrous vitriol and a weak acid, and conducting hot burner gases through a concentrating tower supplied with acid and causing the concentration in the concentrating tower to be carried on to an extent sufficient to cause the deposit of the impurities of the acid, and interchanging the functions of the towers so that the impurities are dissolved.

11. The method of manufacturing concentrated sulfuric acid which consists in conducting a portion of the burner gases through a denitrating apparatus supplied with nitrous vitriol and a weak acid and another portion of hot burner gases through a concentrating apparatus supplied with acid, thereafter bringing the gases together into a cooling apparatus before discharging them into the chambers, causing the concentration in the concentrating apparatus to be carried on to an extent sufficient to cause the deposit of the impurities of the acid, and interchanging the functions of the concentrating and denitrating apparatus so that the impurities deposited are dissolved.

12. The method of manufacturing concentrated sulfuric acid which consists in exposing a body of the acid in the concentrating chamber to the action of hot gases to an extent sufficient to cause the deposit of the impurities thereof, and thereafter reducing the concentrating action to an extent sufficient to cause the impurities to be dissolved.

13. The method of manufacturing concentrated sulfuric acid which consists in conducting hot burner gases through a concentrating tower supplied with acid, carrying the concentration to an extent sufficient to cause the deposit of the impurities thereof, and thereafter reducing the concentrating action of the burner gases to an extent sufficient to cause the impurities to be dissolved.

14. The method of manufacturing concentrated sulfuric acid, which consists in exposing a body of the acid to the action of hot gases so as to concentrate the acid to an extent sufficient to cause the deposit of the impurities thereof, suspending the concentration process and removing the impurities by a body of weak acid in the presence of hot gases.

15. The method of concentrating sulfuric acid which consists in conducting the burner gases through a concentrating tower supplied with acid, carrying the concentration to an extent sufficient to cause the deposit of the impurities thereof, and thereafter removing the impurities with a body of weak acid.

16. The method of concentrating sulfuric acid which consists in conducting the burner gases through a concentrating tower supplied with acid, carrying the concentration to an extent sufficient to cause the deposit of the impurities thereof, and thereafter conducting the gases into a cooling apparatus before discharging them into the chambers.

17. The method of manufacturing concentrated sulfuric acid which consists in concentrating a body of the acid in one chamber to an extent sufficient to cause the deposit of the impurities thereof, suspending the process in said chamber, shifting the acid supply to another chamber, and causing the concentration process to take place therein while the impurities in the first chamber are removed.

In testimony whereof I affix my signature in presence of two witnesses.

OTTO PROELSS.

Witnesses:
W. S. HALL,
CHAS. LINDMUELLER.